United States Patent
Kusko et al.

(10) Patent No.: US 8,176,105 B2
(45) Date of Patent: May 8, 2012

(54) AUTOMATED FILE RELOCATION

(75) Inventors: Mary P. Kusko, Hopewell Junction, NY (US); Frank E. Levine, Austin, TX (US); Stella L. Taylor, Las Vegas, NV (US); Anna W. Topol, Jefferson Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 12/329,797

(22) Filed: Dec. 8, 2008

(65) Prior Publication Data

US 2010/0146019 A1 Jun. 10, 2010

(51) Int. Cl.
*G06F 17/00* (2006.01)
(52) U.S. Cl. .......................... 707/828; 707/693
(58) Field of Classification Search .............. 707/828
See application file for complete search history.

(56) References Cited

U.S. PATENT DOCUMENTS

| | | | |
|---|---|---|---|
| 6,249,807 B1 | 6/2001 | Shaw et al. | |
| 6,282,565 B1 | 8/2001 | Shaw et al. | |
| 6,304,277 B1 * | 10/2001 | Hoekstra et al. | 345/600 |
| 6,380,951 B1 * | 4/2002 | Petchenkine et al. | 715/736 |
| 6,816,885 B1 | 11/2004 | Raghunandan | |
| 6,922,781 B1 * | 7/2005 | Shuster | 713/165 |
| 6,941,304 B2 | 9/2005 | Gainey et al. | |
| 6,992,686 B2 | 1/2006 | Nagarajan | |
| 7,003,551 B2 * | 2/2006 | Malik | 709/206 |
| 7,136,981 B2 | 11/2006 | Burch, Jr. et al. | |
| 7,317,697 B2 * | 1/2008 | Lewis et al. | 370/312 |
| 2001/0044804 A1 * | 11/2001 | Fitzgerald et al. | 707/200 |
| 2002/0124014 A1 * | 9/2002 | Noguchi | 707/204 |
| 2006/0143714 A1 * | 6/2006 | Peterson et al. | 726/26 |

* cited by examiner

*Primary Examiner* — Cheyne Ly
(74) *Attorney, Agent, or Firm* — John R. Pivnichny; Law Office of Jim Boice

(57) ABSTRACT

A computer-implemented method, system and computer program product for managing computer file storage is presented. In one embodiment the method includes receiving a file for storage. In response to determining that the file exceeds a pre-determined size, the file is stored in a pre-designated folder that is reserved for oversized files.

19 Claims, 3 Drawing Sheets

| Date ⌄ | Time | Size | | Subject ⌃ | 204 |
|---|---|---|---|---|---|
| 02/27/2009 | 02:48 PM | 09,766.091 | 🖉 | Industry Skillmaps & Profiling Discussion | |
| 08/17/2009 | 02:30 PM | 91,159.303 | 🖉 | Assessment Instructions | |
| 08/17/2009 | 03:13 AM | 91,159.283 | 🖉 | Assessment Instructions | |
| 08/17/2009 | 02:58 AM | 90,244.119 | 🖉 | Assessment Instructions | |
| 08/29/2009 | 03:23 AM | 39,924.603 | 🖉 | Re Defect 990 - Incorrect SMB Data: Please Provide More Information | |
| 08/22/2009 | 11:33 AM | 39,867.749 | 🖉 | Copy of W34 for Aug 21 | |
| 08/22/2009 | 10:58 AM | 39,867.353 | 🖉 | Testing Call | |
| 12/26/2009 | 11:37 AM | 39,708.674 | 🖉 | Fw: Emailing: Discovery Portfolio.swf. PM Training 3-10-06.htm. PM Training 3-10-06.swf Intro Training.htm. Discovery Intro Training.swf. Discovery Portfolio.htm | |
| 10/26/2009 | 01:20 PM | 39,706.674 | 🖉 | Emailing: Discovery Portfolio.swf. PM Training 3-10-06.htm. PM Training 3-10-06.swf Intro Training.htm. Discovery Intro Training.swf. Discovery Portfolio.htm | |
| 07/25/2009 | 09:43 AM | 28,104.785 | 🖉 | Re: Combined Distribution Lists | |
| 03/23/2009 | 11:18 AM | 25,991.169 | 🖉 | Global PD Program Digital Binder TeamRoom - CCB Minutes for March 22, 2006 | |

AUTOMATED FILE RELOCATION

BACKGROUND OF THE INVENTION

1. Technical Field

The present disclosure relates to the field of computers, and specifically to computer files. Still more particularly, the present disclosure relates to managing the storage of computer files.

2. Description of the Related Art

In a typical computing environment, multiple users will share secondary memory found in a common storage device, such as a hard drive, tape drive, etc. Because of the finite capacity of such storage devices, many companies set limits on how much file space each employee/department is allowed, particularly when it comes to saving and filing documents on a daily basis. Multiple problems arise from such limitations. First, some employees will exceed the file space limitation faster than others. Second, some employees will fail to manage and purge files, thus reducing available space in the common storage device. Because of these problems, some Information Technology (IT) managers will periodically archive and/or purge files. However, such archiving/purging causes users to spend an inordinate amount of time retrieving files needed for current projects.

SUMMARY OF THE INVENTION

A computer-implemented method, system and computer program product for managing computer file storage is presented. In one embodiment the method includes receiving a file for storage. In response to determining that the file exceeds a pre-determined size, the file is stored in a pre-designated folder that is reserved for oversized files.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2 illustrates a Graphical User Interface (GUI) displaying auto-selected files that are to be stored in a pre-defined storage folder that is reserved for oversized files.

DETAILED DESCRIPTION OF THE PREFERRED EMBODIMENT

Figure 1:
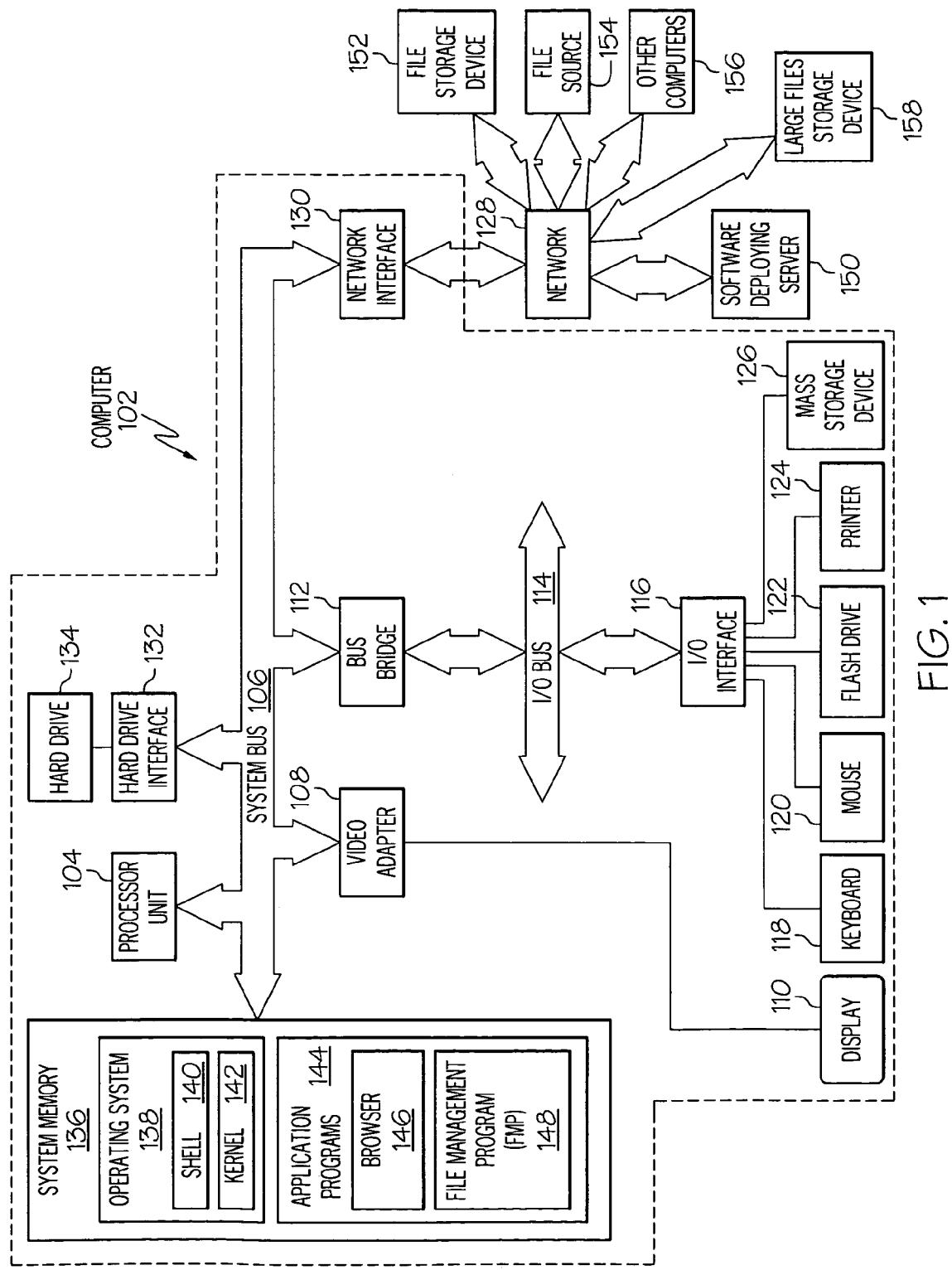
FIG. 1 depicts an exemplary computer which may be utilized by the present invention.

With reference now to the figures, and in particular to FIG. 1, there is depicted a block diagram of an exemplary computer 102, which the present invention may utilize. Note that some or all of the exemplary architecture shown for computer 102 may be utilized by software deploying server 150, file source 154, and other computers 156.

Computer 102 includes a processor unit 104, which may utilize one or more processors each having one or more processor cores, that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Flash Drive 122, a printer 124, and a mass storage device 126 (e.g., a CD-ROM drive, a tape drive, a large hard disk, etc.). The format of the ports connected to I/O interface 116 may be any known to those skilled in the art of computer architecture, including but not limited to Universal Serial Bus (USB) ports.

Computer 102 is able to communicate with a software deploying server 150 via network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a World Wide Web (WWW) client (i.e., computer 102) to send and receive network messages to the Internet using HyperText Transfer Protocol (HTTP) messaging, thus enabling communication with software deploying server 150 and other described computer systems.

Application programs 144 in computer 102's system memory (as well as software deploying server 150's system memory) also include a File Management Program (FMP) 148. FMP 148 includes code for implementing the processes described below, and particularly as described in FIGS. 2-3. In one embodiment, computer 102 is able to download FMP 148 from software deploying server 150, including in an on-demand basis. Note further that, in one embodiment of the present invention, software deploying server 150 performs all of the functions associated with the present invention (including execution of FMP 148), thus freeing computer 102 from having to use its own internal computing resources to execute FMP 148.

In a process described in further detail below, computer 102 is able to receive files from a file source 154. This file source 154 may be an e-mail server, another client computer on network 128, a graphics file provider, etc. The file storage device 152 and the large file storage device 158 are mass storage devices. Examples of such storage devices include, but are not limited to, an optical storage drive (e.g., a CD-ROM drive), a tape drive, a large-capacity hard drive (e.g., a multi-disk drive, a Redundant Array of Inexpensive Disks—RAID system, etc.), etc. Note that file storage device 152 and/or large files storage device 158 may be shared by multiple users, including those using computer 102 and other computers 156 that are coupled to network 128.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

Referring now to FIG. 2, a Graphical User Interface 202 depicts multiple files that need to be stored. A pre-determined level has been set for files that are too large to be stored in a standard common storage folder, since they would appropriate too much of the folder's space. In the example shown in FIG. 2, these files are identified as any file larger than 40 megabytes, as shown within box 204. In accordance with the present invention, then, these identified files will be filed, with or without pre-compaction, in a specially designated folder that has been reserved for oversized files.

Figure 3:
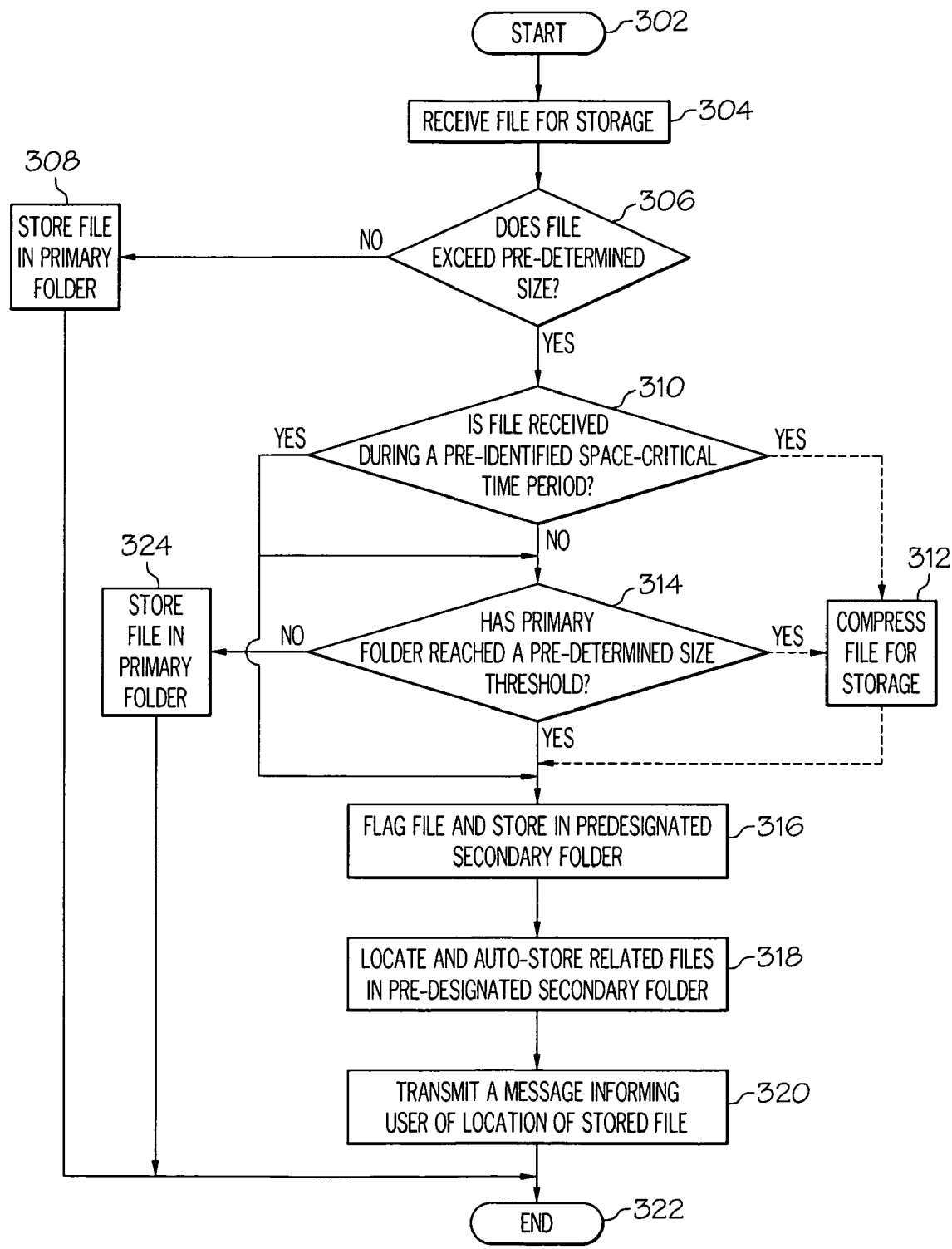
FIG. 3 is a flow-chart of exemplary steps taken to manage the storage of oversized files.

Referring now to FIG. 3, a high-level flow chart of exemplary steps taken to manage the storage of oversized files is presented. After initiator block 302, a file is received for storage (block 304). This file may be received by receiving means, such as the network interface 130 and processor 104 shown in FIG. 1, which are able to execute instructions in FMP 148 that logically determine how the received file is to be stored. Alternatively, the file to be stored is simply a file that has been created by a user, but needs to be stored. In either scenario, the "received" file, which is destined for storage in accordance with any pre-determined criteria set by the receiver, sender, or system administrator, may be an e-mail, a text document, a graphics file, a spreadsheet, or any other data file. If the file does not exceed some pre-determined size (query block 306), then it is stored unaltered in a standard folder (block 308) that is located within some primary storage device. This primary storage device may be a partition within the file storage device 152 shown in FIG. 1 or the hard drive 134 shown in FIG. 1. This "small" file would not be stored in large file storage device 158, since that device is a storage drive that is dedicated to storing only oversized (larger than some pre-determined size) files, as described herein.

Returning to query block 306 in FIG. 3, if the received file is larger than some predetermined size (e.g., is more than 40 megabytes in size), then a query is made as to whether the file was received during some pre-identified space-critical time period (query block 310). This pre-identified space-critical time period may be determined by reviewing a historical usage of some primary storage drive and/or folder. For example, if this primary storage drive (e.g., file storage device 152 shown in FIG. 1) and/or folder (e.g., a primary folder to which files are stored by default when received or created) have a history of being heavily or excessively used to the point of becoming full during some particular day of the week or time of day, and the file is received/created for storage during this particular day of the week or time of day, then the file will be flagged and stored in some pre-designated secondary folder (block 316). This pre-designated secondary folder may be in a primary storage device (e.g., file storage device 152) or a secondary storage device (e.g., large file storage device 158). In one embodiment, the pre-designated secondary folder (or storage device) is reserved for the exclusive use of storing multiple oversized files, as have been pre-defined according to some minimum size to be deemed "oversized." Note also that, in one embodiment, the oversized file that is to be stored may first be compressed before being stored (block 312) in the pre-designated secondary folder.

Similarly, a determination is made as to whether the primary folder has reached some pre-determined size threshold (query block 314). For example, if the primary folder has reached 100 megabytes in size, then the newly arrived/created file may be stored in the pre-designated secondary folder (block 316), with (block 312) or without first being compressed. If the primary folder has not reached the pre-determined size threshold (query block 314), then the incoming file may simply be stored in the primary folder (block 324).

As described in block 316, if the file is of an excessive size, it is then flagged and stored in the pre-designated secondary folder. Note that the pre-designated secondary folder may be color-coded to indicate that it contains only oversized files. Alternatively, the pre-designated secondary folder can be designated and color coded to hold only files related to a particular department or user, projects that have a budget that exceeds a certain pre-determined value, etc. Note also that the pre-designated secondary folder can be protected, such that any file stored within the pre-designated secondary folder is classified as being a protected file that is automatically prevented (protected) from being moved into archival storage. Archived files are files that have been deemed to be inactive, and thus must be retrieved from an archived file (often located in a distant tertiary drive) within the memory hierarchy.

As described in block 318, other related files may also be stored in the pre-designated secondary folder. That is, other files that have a same prefix designation (e.g., files that have been tagged with a prefix to designate which project, team, department, geographical area, etc. that the file is associated with), files with a same suffix (e.g., any files identified as being a Portable Document Format file as identified by a .PDF suffix), files with a same name (e.g., file xxx.commonname.yyy.doc for any text document whose file name includes the term "commonname"), files that have been previously stored in the primary folder but that exceed the pre-determined size described in query block 306, files that are associated with any project that has a budget that exceeds a certain pre-determined cost value, or files that are specifically tagged and/or associated with the type/size/name of files stored in the pre-designated secondary folder may also be retrieved and stored in the pre-designated secondary folder.

As depicted in block 320, a message is transmitted to a user that certain files have been reassigned to the pre-designated secondary folder, even if done without the permission and/or knowledge of the user. For example, assume that, during the course of a workday, a user has created or received one or more files that exceed the pre-determined size described in block 306. While the user is away from her terminal, logic (e.g., FMP 148 shown in FIG. 1) may automatically relocate these files to the pre-designated secondary folder. The user would not know that this occurred, or where the files are now located, unless a message (e.g,. a terminal message, an e-mail, etc.) is sent to the user, notifying the user that a relocation action has occurred, and telling the user where the files can now be found (including the file name, Uniform Resource Locator—URL, Lightweight Directory Access Protocol—LDAP folder location, or other address needed to locate the new pre-designated secondary folder). The process ends at terminator block 322.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data. Note further that the steps depicted in any flow-chart may or may not be in sequential order, and thus may be rearranged while still reflecting exemplary operative steps of the present invention.

What is claimed is:

1. A computer-implemented method of managing file storage, the computer-implemented method comprising:
    a computer receiving a file for storage;
    in response to determining that the file exceeds a pre-determined size, the computer storing the file in a pre-designated folder that is reserved for oversized files;
    the computer, in response to determining that the file has been received during a pre-identified space-critical time period, compressing the file before storage in the pre-designated folder, wherein the pre-identified space-critical time period is a time period in which a historically high level of memory space need has been recorded, and wherein the historically high level of memory space need previously caused memory space to become full during a particular time of day;
    the computer storing files that are specifically identified by a pre-determined file name in the pre-designated folder;
    the computer classifying the pre-designated folder as being protected such that any file stored within the pre-designated folder is prevented from being moved into archival storage; and
    the computer transmitting a message to a user that certain files have been reassigned to the pre-designated folder for storage, wherein the message notifies the user that a relocation action has occurred, and wherein the message tells the user where the oversized files are currently located.

2. The computer-implemented method of claim 1, further comprising:
    in response to determining that the pre-designated folder has reached a pre-determined size, compressing the file before storage in the pre-designated folder.

3. The computer-implemented method of claim 1, wherein the pre-designated folder is reserved for files that are common to a single job project.

4. The computer-implemented method of claim 3, further comprising:
    identifying and storing, in the pre-designated folder, any other file that is associated with the single job project.

5. The computer-implemented method of claim 1, wherein the pre-designated folder is reserved for files that are used by a single work group.

6. The computer-implemented method of claim 1, further comprising:
    compressing any file that is identified by the pre-determined file name into a compressed identified file; and
    storing said compressed identified file in the pre-designated folder.

7. The computer-implemented method of claim 1, wherein the file is an incoming e-mail.

8. The computer-implemented method of claim 1, wherein the file is a text document.

9. The computer-implemented method of claim 1, wherein the file is a graphics file.

10. The computer-implemented method of claim 1, further comprising:
    classifying the file that exceeds the pre-determined size as a protected file; and
    automatically preventing an archival storage of the protected file.

11. The computer-implemented method of claim 10, wherein the protected file is defined as a file that is associated with projects in a certain pre-defined geographical region.

12. The computer-implemented method of claim 10, wherein the protected file is defined as a file that is associated with a certain customer.

13. The computer-implemented method of claim 10, wherein the protected file is defined as a file that is associated with a project that has a budget that exceeds a certain pre-determined value.

14. The computer-implemented method of claim 10, wherein the protected file is defined as a file that contains security protection instructions for a computer that stores the pre-designated folder.

15. The computer-implemented method of claim 1, wherein the message provides the user with a logical name and location of the pre-designated folder in which the oversized files are stored.

16. The computer-implemented method of claim 1, further comprising:
    color-coding the pre-designated folder to indicate that only compressed files are stored within the pre-designated folder.

17. A computer system comprising:
    a processor and a network interface for receiving a file for storage;
    a computer storage device and the processor for, in response to determining that the file exceeds a pre-determined size, storing the file in a pre-designated folder that is exclusively reserved for the storage of multiple oversized files;

the processor, in response to determining that the file has been received during a pre-identified space-critical time period, compressing the file before storage in the pre-designated folder, wherein the pre-identified space-critical time period is a time period in which a historically high level of memory space need has been recorded, and wherein the historically high level of memory space need previously caused memory space to become full during a particular time of day;

the processor storing files that are specifically identified by a pre-determined file name in the pre-designated folder;

the processor classifying the pre-designated folder as being protected such that any file stored within the pre-designated folder is prevented from being moved into archival storage; and the processor transmitting a message to a user that certain files have been reassigned to the pre-designated folder for storage, wherein the message notifies the user that a relocation action has occurred, and wherein the message tells the user where the oversized files are currently located.

18. A computer-readable storage medium on which is encoded a computer program, the computer program comprising computer executable instructions configured for:

receiving a file for storage;

in response to determining that the file exceeds a pre-determined size, storing the file in a pre-designated folder that is reserved for oversized files;

in response to determining that the file has been received during a pre-identified space-critical time period, compressing the file before storage in the pre-designated folder, wherein the pre-identified space-critical time period is a time period in which a historically high level of memory space need has been recorded, and wherein the historically high level of memory space need previously caused memory space to become full during a particular time of day;

storing files that are specifically identified by a pre-determined file name in the pre-designated folder;

classifying the pre-designated folder as being protected such that any file stored within the pre-designated folder is prevented from being moved into archival storage; and transmitting a message to a user that certain files have been reassigned to the pre-designated folder for storage, wherein the message notifies the user that a relocation action has occurred, and wherein the message tells the user where the oversized files are currently located.

19. The computer-readable storage medium of claim 18, wherein the computer executable instructions are provided by a service provider to a customer's computing device in an on-demand basis.

\* \* \* \* \*